United States Patent
Venkataramani et al.

(10) Patent No.: US 7,310,405 B2
(45) Date of Patent: Dec. 18, 2007

(54) HIGH-Z CAST REFLECTOR COMPOSITIONS AND METHOD OF MANUFACTURE

(75) Inventors: Venkat Subramaniam Venkataramani, Clifton Park, NY (US); Steven Jude Duclos, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 10/259,557

(22) Filed: Sep. 27, 2002

(65) Prior Publication Data

US 2003/0021374 A1 Jan. 30, 2003

Related U.S. Application Data

(63) Continuation of application No. 09/681,736, filed on May 30, 2001, now Pat. No. 6,519,313.

(51) Int. Cl.
*G01T 1/20* (2006.01)

(52) U.S. Cl. .................. 378/19; 250/367; 250/370.09; 250/370.11

(58) Field of Classification Search .................. 378/19, 378/98.8, 147–155; 250/363.1, 367, 368, 250/370.11, 505.1, 515.1, 370.09, 369
See application file for complete search history.

(56) References Cited

U.S. PATENT DOCUMENTS

| | | | |
|---|---|---|---|
| 3,715,331 A * | 2/1973 | Molnar ........................ 523/117 |
| 3,854,964 A * | 12/1974 | Thomas et al. ................ 501/62 |
| 3,936,645 A * | 2/1976 | Iversen .................... 250/370.11 |
| 4,082,957 A | 4/1978 | Morlan ........................ 378/156 |
| 4,203,886 A * | 5/1980 | Hirai et al. .................. 524/403 |
| 4,313,026 A | 1/1982 | Yamada et al. ............. 174/256 |
| 4,473,513 A | 9/1984 | Cusano et al. ............. 264/1.22 |
| 4,518,546 A | 5/1985 | Greskovich et al. ........ 264/1.22 |
| 4,533,489 A * | 8/1985 | Utts et al. .............. 252/301.17 |
| 4,694,177 A * | 9/1987 | Akai ........................... 250/368 |
| 4,725,734 A | 2/1988 | Nishiki ........................ 250/366 |
| 4,734,588 A | 3/1988 | Akai ........................ 250/370.11 |
| 4,767,798 A * | 8/1988 | Gasser et al. ................ 523/117 |
| 4,769,353 A | 9/1988 | Greskovich et al. ........ 501/126 |
| 4,804,885 A * | 2/1989 | Petersen et al. ............. 313/480 |
| 4,845,363 A | 7/1989 | Akai ........................ 250/201.2 |
| 4,914,301 A | 4/1990 | Akai ...................... 250/370.01 |
| 4,982,096 A * | 1/1991 | Fujii et al. .................... 250/367 |
| 5,111,493 A * | 5/1992 | Siedband ..................... 378/103 |
| 5,144,141 A | 9/1992 | Rougeot et al. ............. 250/369 |
| 5,378,894 A | 1/1995 | Akai ............................ 250/368 |
| 5,455,849 A * | 10/1995 | Logan et al. ................ 378/154 |
| 5,521,387 A | 5/1996 | Riedner et al. ............. 250/367 |
| 5,550,383 A * | 8/1996 | Haskell .................... 250/519.1 |
| 5,559,853 A * | 9/1996 | Linders et al. .............. 378/159 |
| 5,636,299 A | 6/1997 | Bueno et al. .................. 385/15 |
| 5,712,483 A * | 1/1998 | Boone et al. ................ 250/367 |
| 5,768,340 A * | 6/1998 | Geittner et al. ............. 378/159 |

(Continued)

*Primary Examiner*—Allen C. Ho
(74) *Attorney, Agent, or Firm*—Jason K. Klindtworth; William E. Powell, III

(57) ABSTRACT

A scintillator pack comprises an array of scintillator pixels and an x-ray absorbing layer disposed in inter-scintillator regions between the scintillator pixels. The x-ray absorbing layer acts to absorb x-rays and protect underlying regions of the inter-scintillator regions. The x-ray absorbing layer may be formed by a number of methods including casting and melt infiltration.

11 Claims, 4 Drawing Sheets

U.S. PATENT DOCUMENTS

| | | | |
|---|---|---|---|
| 5,827,790 A * | 10/1998 | Evans et al. | 501/66 |
| 5,831,269 A | 11/1998 | Nakamura et al. | 250/367 |
| 5,866,908 A * | 2/1999 | Novak | 250/368 |
| 5,956,382 A | 9/1999 | Wiener-Avnear et al. | 378/98.8 |
| 6,197,710 B1 | 3/2001 | Ohara et al. | 501/4 |
| 6,252,231 B1 * | 6/2001 | Harootian | 250/368 |
| 6,252,927 B1 * | 6/2001 | Wieczorek et al. | 378/19 |
| 6,297,181 B1 * | 10/2001 | Kunert et al. | 501/57 |
| 6,298,113 B1 | 10/2001 | Duclos et al. | 378/19 |
| 6,344,649 B2 * | 2/2002 | Riedner et al. | 250/367 |
| 6,452,186 B1 * | 9/2002 | Wieczorek et al. | 250/370.11 |
| 6,479,824 B1 * | 11/2002 | Hoffman | 250/367 |
| 6,495,845 B1 * | 12/2002 | Tsunota et al. | 250/505.1 |
| 6,541,773 B1 * | 4/2003 | Iwabuchi et al. | 250/370.11 |
| 6,548,570 B1 * | 4/2003 | Lange | 523/137 |

* cited by examiner

HIGH-Z CAST REFLECTOR COMPOSITIONS AND METHOD OF MANUFACTURE

This application is a continuation Ser. No. 09/681,736, filed May 30, 2001, now U.S. Pat. No. 6,519,313 which is hereby incorporated by reference in its entirety.

BACKGROUND OF THE INVENTION

This invention relates generally to high-Z inter-scintillator materials and a method of manufacturing such inter-scintillator reflectors, where the high-Z inter-scintillator material acts as a high density x-ray absorber.

Solid state detectors for computed tomography (CT) imaging use scintillators to convert x-rays into scintillation radiation which itself is converted to an electrical signal with a photodiode. Detector arrays are typically comprised of scintillator pixels separated by an inter-scintillator material used to pipe the scintillation radiation towards the diode. The materials used as the inter-scintillator material are typically highly reflecting at the scintillation radiation wavelengths emitted by the scintillator in order to collect a large fraction of the scintillation radiation at the diode.

Appropriate inter-scintillator materials include high refractive index solid materials such as $TiO_2$ formed in a castable low index medium such as an epoxy. One drawback of such a system is the darkening of the inter-scintillator material when it is struck by a dose of x-rays commonly used in CT imaging. A typical dose over the life of the detector is 1 Mrad. This darkening results in lower reflectivity and less efficient collection of the scintillation radiation, and thus a lowering of the sensitivity of the x-ray detector.

Furthermore, the darkening is often not uniform over the entrance face of the detector. This lack of uniformity in darkening can result in image degradation if the detector is not properly calibrated. In addition to the inter-scintillator material itself, the diode below the reflector is also sensitive to radiation and must be protected from the x-ray beam.

Current CT detectors use a collimator assembly to protect the inter-scintillator material from damage by x-rays. This assembly consists of tall tungsten plates aligned perpendicular to the plane of the x-ray fan beam. This assembly is primarily used to minimize scattered x-rays from reaching the scintillator, but is also used to protect the inter-scintillator material between pixels from the x-rays. For multi-slice CT, where the detector is segmented in the direction parallel to the fan beam, wires are used to protect the reflector and diodes. These wires are strung between the deep plates in grooves machined in the plates.

The manufacturing of such a two dimensional collimator with plates and wires is complex. The separate construction of the collimator with protective wires and the scintillator/reflector body requires accurate alignment of these devices during construction of the complete detector. This alignment cannot be done optically since the inter-scintillator material between the scintillator pixels is obscured by reflector material covering the top of the pixels ("surface reflector"). Therefore, either x-ray alignment or rigorous dimensional tolerances must be used to ensure that the reflector material is aligned with the protective wires.

BRIEF SUMMARY OF THE INVENTION

In view of the foregoing, it would be desirable to provide a scintillator pack including a scintillator pixel array, and an x-ray absorbing layer in the inter-scintillator regions that avoids or reduces the above mentioned problems. The x-ray absorbing layer eliminates the requirement of protective tungsten cross-wires over the interscintillator regions. Thus quality and reproducibility are improved, while costs are reduced.

In accordance with one aspect of the present invention, there is provided a scintillator pack. The scintillator pack comprises an array of scintillator pixels and an x-ray absorbing layer formed in inter-scintillator regions between the scintillator pixels. The x-ray absorbing layer comprises a high density x-ray absorbing material.

In accordance with another aspect of the present invention there is provided an x-ray device. The x-ray device comprises an x-ray source, a scintillator pack, and a scintillation radiation detector. The scintillator pack has an array of scintillator pixels where a pixel of the array emits scintillation radiation upon an x-ray from the x-ray source being absorbed by the pixel. The scintillator pack also includes an x-ray absorbing layer, comprising a high density x-ray absorbing material, formed in inter-scintillator regions between the scintillator pixels. The scintillation radiation detector is optically coupled to the scintillator pack for detecting scintillation radiation.

In accordance with another aspect of the present invention there is provided an x-ray detection device. The x-ray detection device comprises a scintillator pack and a scintillation radiation detector. The scintillator pack has an array of scintillator pixels where a pixel of the array emits scintillation radiation upon an x-ray being absorbed by the pixel. The scintillator pack also includes an x-ray absorbing layer, comprising a high density x-ray absorbing material, formed in inter-scintillator regions between the scintillator pixels. The scintillation radiation detector is optically coupled to the scintillator pack for detecting scintillation radiation.

In accordance with another aspect of the present invention there is provided a method of forming a scintillator pack. According to this aspect of the invention the method comprises providing an array of scintillator pixels, and forming an x-ray absorbing layer in inter-scintillator regions between the scintillator pixels, where the x-ray absorbing layer is of a high density x-ray absorbing material.

According to this aspect of the invention the x-ray absorbing layer may be formed by disposing a melted eutectic alloy of a metal into the inter-scintillator regions between the scintillator pixels.

According to this aspect of the invention the x-ray absorbing layer may alternatively be formed by disposing a glass melt into the inter-scintillator regions between the scintillator pixels, and cooling the glass melt to form a glass in the inter-scintillator regions.

According to this aspect of the invention the x-ray absorbing layer may alternatively be formed by providing a high density x-ray absorbing powder, dispersing the powder within a liquid matrix to form a precursor mix, disposing the precursor mix within the inter-scintillator regions, and solidifying the precursor mix to form a solid layer.

DETAILED DESCRIPTION OF THE INVENTION

Figure 1:
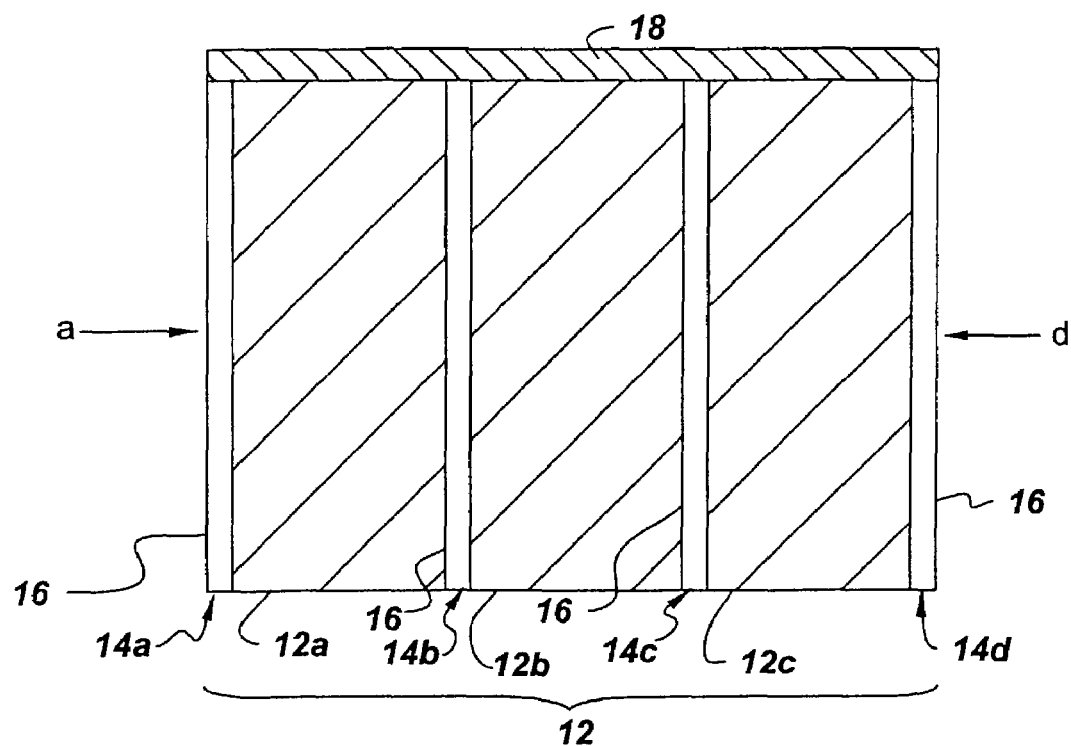
FIG. 1 is a side view of a scintillator pack including an x-ray absorbing layer according to an embodiment of the present invention.

FIG. 1 is a scintillator pack 10 according to an embodiment of the present invention. The scintillator pack 10 includes an array 12 of scintillator pixels 12a, 12b, 12c, etc. FIG. 1 shows only a fraction of the scintillator pack for ease of illustration, and in general, the array 12 will include many more pixels than those shown in FIG. 1. The scintillator pack 10 further includes inter-scintillator regions 14a, 14b, 14c, etc., which are the regions between the scintillator pixels. The inter-scintillator regions 14a, 14b, 14c, etc. are filled with an x-ray absorbing layer 16.

The x-ray absorbing layer 16 comprises a high density x-ray absorbing material. In application, the x-ray absorbing material preferably should be able to absorb x-rays in application within an effective thickness of about 3 mm. The x-rays are considered to be sufficiently absorbed if the thickness stops at least 99% of the x-rays. In this regard, the high density x-ray absorbing material should have a high effective atomic number (Z). The x-ray stopping power of a material is primarily dependent on the effective atomic number of the material. Combined with the mass density, the atomic number (Z) determines the electron cross-section which interacts with the x-ray radiation. Specifically, the ratio of the intensity of the x-ray radiation transmitted through a material, I, to the x-ray radiation incident upon a material, $I_0$, is given as $I/I_0=\exp\{-(\mu/\rho)x\}$, where $\mu$ is the absorption coefficient which is proportional to $Z^2$, $\rho$ is the mass density, and x is the distance traveled through the material.

In application, the x-rays will impinge upon the scintillator pack at an angle that is approximately normal to the top surface. Thus, a large fraction of the x-rays impinging upon the inter-scintillator regions of scintillator pack should preferably be stopped within a distance of about 3 mm upon traveling in the x-ray absorbing layer 16. Beneficially, the inter-scintillator regions below this first 3 microns will be largely protected from x-rays.

The x-ray absorbing layer 16 should also not substantially absorb scintillation radiation from the adjacent pixels. Instead, it is preferred that the x-ray absorbing layer 16 be highly reflecting to scintillation radiation so that the x-ray absorbing layer 16 acts to channel scintillation radiation in the pixels to an underlying scintillation radiation detector (not shown in FIG. 1). In this regard, it is preferred that the x-ray absorbing layer 16 have an index of refraction greater than 1.80.

The scintillator pack may also include a scintillation radiation reflecting layer 18 which extends over the top of the scintillator pixels. The scintillation radiation reflecting layer 18 acts to reflect scintillation radiation, emitted from a scintillator pixel upon an x-ray being absorbed by the scintillator material in the pixel, back down to an underlying scintillation radiation detector. Thus, the scintillation radiation reflecting layer 18 is made of an appropriate scintillation radiation reflecting material. Optionally, the scintillation radiation reflecting layer 18 may be excluded.

In FIG. 1 the scintillation radiation reflecting layer 18 is formed directly on the top of the scintillator pixels. However, it may be desirable to include one or more layers between the scintillation radiation reflecting layer 18 and the scintillator pixels. For example, depending on the scintillation radiation reflecting layer 18, the material of the scintillator pixels, and the method of depositing the scintillation radiation reflecting layer 18, it may be desirable to include an adhesion or nucleation layer or layers between the scintillator pixels and the scintillation radiation reflecting layer 18.

Figure 2:
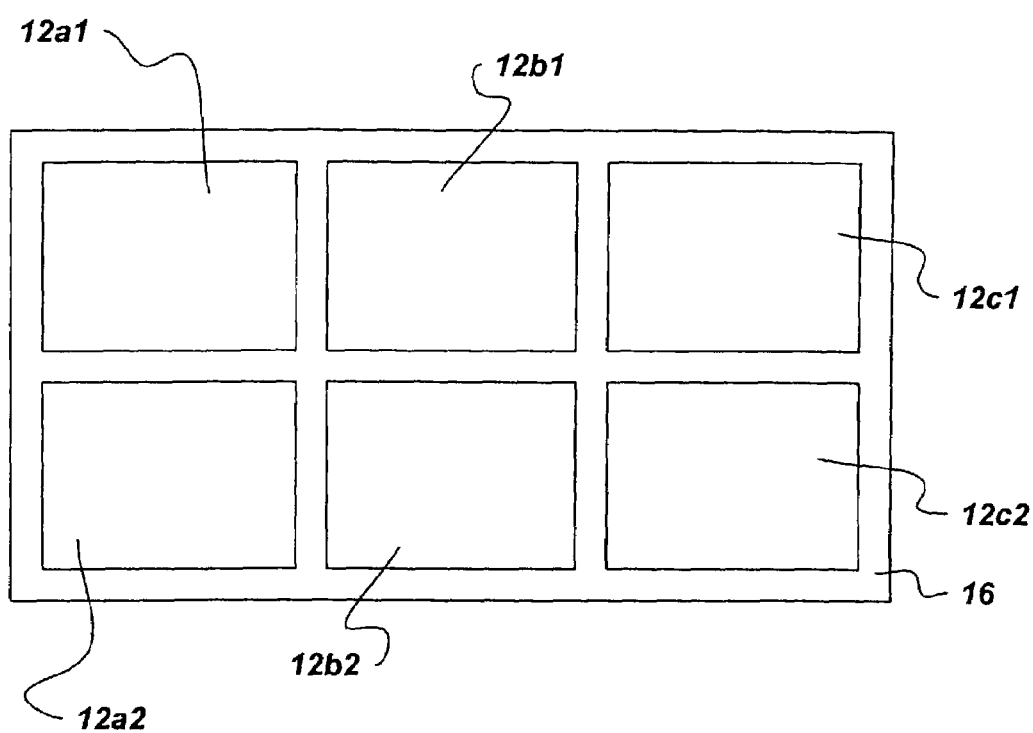
FIG. 2 is a cross-sectional view of the scintillator pack of FIG. 1.

FIG. 2 shows a cross-sectional view of the scintillator pack of FIG. 1 along the line a-a. In FIG. 2, the array 12 is a two-dimensional array with an x-ray absorbing layer 16 in the inter-scintillator regions between the pixels 12a1, 12a2, 12b1, 12b2, 12c1, 12c2 of the array 12. In FIG. 2, the two-dimensional array contains rectangular cross-sectioned scintillator pixels with the x-ray absorbing material forming a grid pattern. However, the pixels may be arranged such that the x-ray absorbing material forms a pattern other than a grid pattern. The pixels may have a cross-section other than rectangular, such as circular or triangular. The array need not be two-dimensional and may instead be one-dimensional.

The scintillator material of the scintillator pixels may be any appropriate x-ray scintillator material. Appropriate scintillator host materials include, for example, gadolinium gallium garnet, gadolinium scandium gallium garnet, gadolinium scandium aluminum garnet, lutetium aluminum garnet, yttrium gallium garnet, ytrrium gadolinium oxide, $Gd_2O_2S$, CsI:Tl, CsI, and lutetium orthosilicate.

The scintillation radiation reflecting material will depend upon the wavelength of the scintillation radiation emitted by the scintillator. For example, in the case of visible scintillation radiation, the scintillation radiation reflecting material could be a high refractive index solid such as $TiO_2$ in a castable low index medium such as an epoxy. Silver and gold plated pressure sensitive adhesives and multilayer dielectric stacks can also be used as scintillation light reflectors.

The high density x-ray absorbing layer comprises a high density material with good x-ray absorbing properties. Examples of preferred high density materials include high density metals such as hafnium, tantalum, gadolinium, lutetium, bismuth, antimony, lead, cadmium, tungsten, molybdenum, niobium, platinum, palladium, silver, and alloys of these metals. The high density material need not be in elemental form, and may be a compound such an oxide, sulfate, sulfide, or fluoride, for example. Preferred oxides include high density compounds, such as hafnium oxide, tantalum oxide, gadolinium oxide, lutetium oxide, tungsten oxide, lead oxide, bismuth titanium oxide, barium titanium oxide, barium hafnium oxide, etc.

The x-ray absorbing layer 16 may comprise only high density x-ray absorbing material. Alternatively, the x-ray absorbing layer may be a composite material which comprises both high density x-ray absorbing materials and other materials. In any case, the composite material should have good x-ray absorbing properties. For example, the x-ray absorbing layer may be a composite material including a polymer organic or inorganic binder with high density particles embedded within the organic or inorganic binder. Appropriate organics include, for example, epoxy, polyester, and polymethylmethacrylate. Inorganic binders include silicates or phosphates, such as potassium silicate and aluminum phosphate, respectively. The x-ray absorbing material would then be a binder matrix filled with high density particles.

The high density particles preferably include high density materials discussed above. For example, the high density particles may be hafnium, tantalum, gadolinium, lutetium, bismuth, antimony, lead, cadmium, tungsten, molybdenum, niobium, platinum, palladium, silver, and alloys of these metals. The high density particles may also include compounds such as oxides, sulfates, sulfides, and fluorides. For example, preferred oxides for the high density particles include compounds, such as hafnium oxide, tantalum oxide, gadolinium oxide, lutetium oxide, tungsten oxide, and lead oxide. Appropriate sulfates include gadolinium sulfate and barium sulfate, for example. Other appropriate high density compounds include bismuth titanate, barium titanate, and barium hafnate.

The concentration of the high density particles in the x-ray absorbing layer 16 will depend upon the composition of the high density particles chosen, and the x-ray energy to be used in operation for the scintillator pack 10. The ratio of the intensity of the x-ray radiation transmitted through a material, I, to the x-ray radiation incident upon a material, $I_0$, is given as $I/I_0=\exp\{-(\mu/\rho)x\}$, where $\mu$ is the absorption coefficient which is proportional to $Z^2$, and dependent upon the x-ray energy, and $\rho$ is the mass density, and x is the distance traveled through the material. In general, high density particles, i.e., particles with a greater atomic number, will provide greater stopping power in attenuating incident x-rays. Thus, a lower concentration of high density particles may be sufficient in the case that particles with a particularly high density are used. Also, in general, the concentration of high density particles in the x-ray absorbing layer 16 should be greater for higher energy x-rays than for lower energy x-rays. The concentration of the high density particles should be sufficient to stop x-rays within an effective distance of about 3 mm.

The average size of the particles chosen will depend, in part, on the desired light scattering quality of the x-ray absorbing layer. Because the light scattering due to the particles is wavelength dependent, the average size chosen will depend upon the wavelength of the scintillation radiation. For typical scintillation radiation wavelengths the size of the particles is preferably within the range of about 0.15 to the about 0.35 microns.

The x-ray absorbing material may be a glass or crystalline material, or a material with some other type of structure, or a combined structure. For example, the x-ray absorbing material may be high density glass ceramic with embedded crystallites. Appropriate glasses for the high density glass ceramic include fluoride glasses such as HBLAN (hafnium barium lanthanum aluminum sodium fluoride), ZBLAN (zirconium barium aluminum sodium fluoride), rare earth borates, bismuth borosilicates, aluminates, tantalates and tungstates. The crystallites in the glass matrix may be of the same material as the matrix or of a different material. For example, if the glass matrix comprises HBLAN, the crystallites may be HBLAN crystallites precipitated within the glass matrix. Preferably, the size of the crystallites is within the range of about 0.15 to the about 0.35 microns so that the crystallites act as good light scattering agents for typical scintillation radiation wavelengths. Alternatively, if the x-ray absorbing layer comprises a high density glass with sufficient scintillation radiation reflection for a particular application, the glass need not include crystallites.

In use, each scintillator pixel of the scintillator pack is optically coupled to a photodetector (not shown in FIGS. 1 and 2), such as a photodiode. Each scintillator pixel may be coupled to its corresponding photodetector simply by placing the bottom of the scintillator pixel adjacent to its corresponding photodetector. Alternatively, the scintillation light might be piped from the scintillator pixel to its corresponding photodetector via a fiber optic or by other means.

Figure 3:
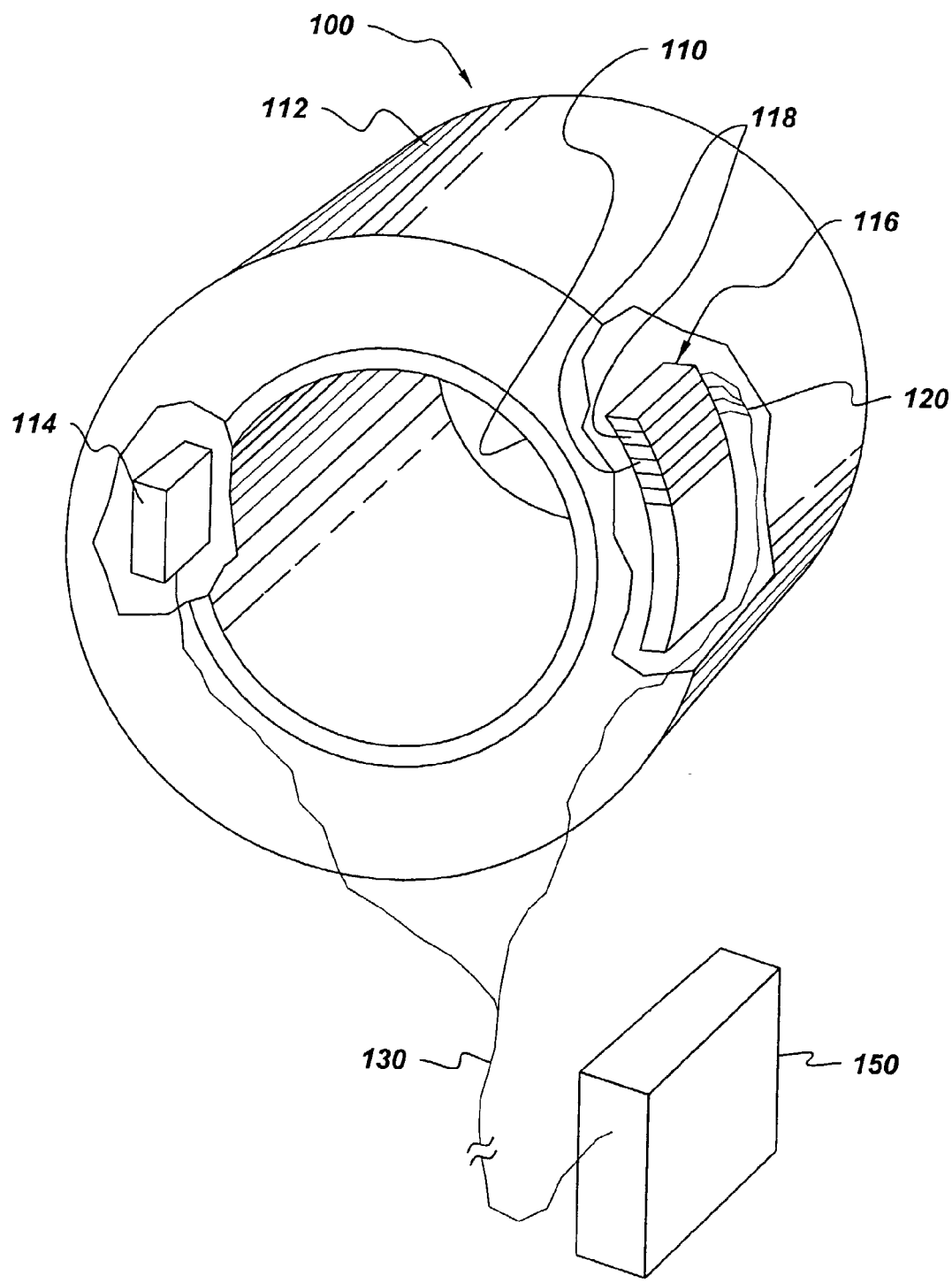
FIG. 3 is a stylized perspective of a portion of a CT machine containing a scintillator pack including an x-ray absorbing layer according to another embodiment of the invention.

A CT scanning system 100 is illustrated schematically in FIG. 3. This CT scanning system 100 comprises a cylindrical enclosure 110 in which the patient or object to be scanned is positioned. A gantry 112 surrounds the cylinder 110 and is configured for rotation about the cylinder's axis. The gantry 112 may be designed to revolve for one full revolution and then return or may be designed for continuous rotation, depending on the system used to connect the electronics on the gantry to the rest of the system. The electronics on the gantry include an x-ray source 114 which preferably produces a fan shaped x-ray beam which encompasses a scintillation radiation detector system 116 mounted on the gantry on the opposite side of the cylinder 110. The fan pattern of the x-ray source is disposed in the plane defined by the x-ray source and the scintillation radiation detector system 116.

The scintillation radiation detector system 116 is very narrow or thin in the direction perpendicular to the plane of the x-ray fan beam. Each pixel 118 of the scintillation radiation detector system incorporates a solid translucent bar of a scintillator material and a photodetector diode optically coupled to that scintillator bar. The pixels are arranged in an array such as discussed above with respect to FIG. 1. The pixel array is part of a scintillator pack with an x-ray absorbing layer in the interscintillator regions as described above with respect to FIG. 1.

The output from each photodetector diode is connected to an operational amplifier (not shown) which is mounted on the gantry. The output from each operational amplifier is connected either by individual wires 120 or by other electronics to the main control system 150 for the CT system 100. In the illustrated embodiment, power for the x-ray source and signals from the scintillation radiation detector are carried to the main control system 150 by a cable 130. The use of the cable 130 generally limits the gantry to a single full revolution before returning to its original position.

Alternatively, slip rings or optical or radio transmission may be used to connect the gantry electronics to the main control system 150 where continuous rotation of the gantry is desired. In CT scanning systems of this type, the scintillator material is used to convert incident x-rays to luminescent light which is detected by the photodetector diode and thereby converted to an electrical signal as a means of converting the incident x-rays to electrical signals which may be processed for image extraction and other purposes.

Figure 4:
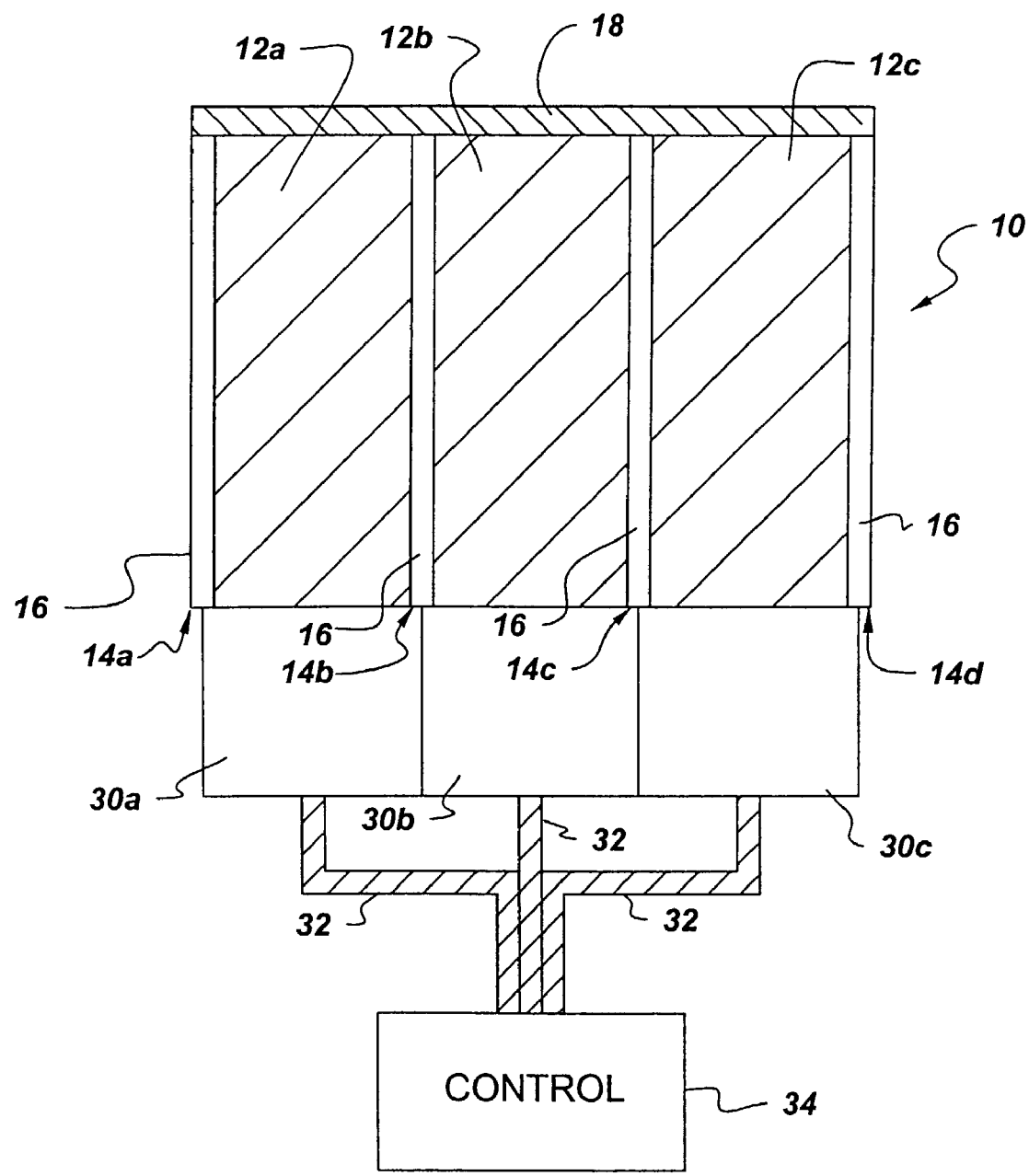
FIG. 4 is a schematic of an x-ray detection device according to another embodiment of the invention.

FIG. 4 is a schematic of an x-ray detection device according to another embodiment of the invention. The x-ray detection device includes a scintillator pack 10, such as the scintillator pack discussed supra with respect to FIG. 1. The scintillator pack 10 includes an array of scintillator pixels 12a, 12b, 12c, etc., interscintillator regions 14a, 14b, 14c, etc., an x-ray absorbing layer 16, and a scintillation radiation reflecting layer 18, as also discussed supra. Each of the scintillator pixels 12a, 12b, 12c, is optically coupled to a corresponding cell 30a, 30b, 30c of scintillation radiation detector 30. The scintillation radiation detector 30 is shown with only three cells 30a, 30b, 30c for the sake of illustration. In practice, the scintillation radiation detector 30 is not limited to three cells. Typically, the scintillation radiation detector 30 comprises many more cells.

The scintillation radiation detector cells may be, for instance, photodiodes. The output signals of the scintillation radiation detector cells are coupled to a controller 34 by means of individual wires or other electronics 32.

Methods of forming the scintillator pack of the present invention are now described. Initially, an array of scintillator pixels is provided, as is known in the art. For example, the scintillator pixels may be formed of bulk polycrystalline scintillator material formed from a powder as disclosed, for example, in U.S. Pat. Nos. 4,473,513, 4,518,546, 4,769,353, and 5,521,387. However, the present invention is not limited to bulk polycrystalline scintillator material and other scintillator material may also be used.

Once the array of scintillator pixels is provided, the x-ray absorbing layer comprising a high density x-ray absorbing material is then formed in the inter-scintillator regions between the scintillator pixels. The x-ray absorbing layer may be formed by a number of methods.

According to one embodiment of the invention, the x-ray absorbing layer may be formed by melting a eutectic alloy of a metal, and disposing the melted metal into the inter-scintillator regions between the scintillator pixels. In this embodiment it is preferred that the metal have good scintillation radiation reflecting properties to channel scintillation radiation towards a photodetector. Appropriate metals include, for example, lead, tungsten, molybdenum, platinum, palladium, bismuth, tin, silver, and alloys thereof. The selected metal or alloys thereof can be impregnated in molten form into the inter-scintillator regions and then cooled to solidify to form a solid film. Alternately, the metal ot alloy can be inserted into the inter-scintillator regions in non-molten form and then heated to melt and bond the metal or alloy to the surface of the scintillator pixels defining the boundaries of the inter-scintillator regions. As an alternative method the metal or alloy may be introduced into the inter-scintillator regions by evaporation or electrodeposition.

According to another embodiment of the invention, the x-ray absorbing layer may be formed by disposing a high density glass melt into the inter-scintillator regions. For example, the components of HBLAN or ZBLAN glass may be heated to form a glass melt and then melt infiltrated into the inter-scintillator regions. The molten glass is poured into inter-scintillator regions. The melt is then-cooled to form a glass in the inter-scintillator regions.

If desired, the high density glass may then be further annealed at a temperature and atmosphere sufficient to form crystallites of the ceramic within the glass matrix, and thus form a high density glass ceramic. The process of recrystallization of the glass can be performed at a predetermined temperature regime below the melting point of the parent glass—usually around ⅓ to ½ the melting point. The temperature/time profile and the atmosphere for recrystallization is dependent upon the particular glass composition. For example, a bismuth titanate phase can be recrystallized from a Bismuth titanium borate glass at ~400° C. in air. Beneficially, the crystallites act as scattering centers for the scintillation radiation. In this regard it is preferable that the size of the particles be within the range of about 0.15 to 0.35 microns for typical scintillation radiation wavelengths.

According to another embodiment of the invention, the x-ray absorbing layer may be formed by casting. In this embodiment, a high density x-ray absorbing powder is provided. The powder may be, for example, a high density metal or a high density metal compound. Appropriate high density metal compounds include oxides, sulfates, sulfides, fluorides and combinations of these compounds. Appropriate oxides include hafnium oxide, tantalum oxide, gadolinium oxide, lutetium oxide, tungsten oxide, and compounds thereof such as barium hafnate, bismuth titanate, lutetium hafnate etc.

The powders with the required particle sizes may be produced by any of number of techniques known in the art. For example, the powders may be produced by the reaction of oxides or oxide precursors through a heat treatment step followed by comminution and classification to the required particle size range. The powders may also be produced by precipitation and heat treatment of the precipitate from appropriate precursor solutions followed by comminution and classification as needed. The powders may also be produced by hydrothermal synthesis from suitable precursors, synthesis through a molten salt process, and by other known processes such as flame pyrolysis, self propagated synthesis, and evaporative reactive calcining. Preferably, the size of the particles is within the range of about 0.15 to 0.35 microns.

The high density powder is then dispersed within a liquid matrix to form a precursor mix, such as a slurry. The liquid matrix may be, for example, suitable polymeric organic or inorganic binders, such as epoxy, polystyrene, polyester, acrylate, silicates and phosphates. Additionally, additives may be added to the precursor mix to stabilize the precursor mix to x-ray radiation and thus prevent discoloration. Examples of such additives include TMBOX, hexahydro-4-methylphthalic anhydride, and cerium salts.

The precursor mix is then cast within the inter-scintillator regions. For example, the slurry may be impregnated into the inter-scintillator regions under pressure or vacuum. The cast precursor mix is then solidified to form a solid layer. The method of solidifying the cast precursor mix will depend upon the composition of the mix. For example, the slurry may be solidified through a heat treatment step during which the binder polymerizes into a solid containing the filler particles uniformly dispersed in its matrix. If the mix contains epoxy as a binder, the mix may be heat treated at the required temperature over a specific period of time to polymerize the binder into a solid. These treatments beneficially may increase the resistance of the x-ray absorption layer to water vapor.

EXAMPLE

One example of a high density x-ray absorbing material according to the invention was formed as follows. A slurry containing barium hafnate powder in Epotek 301 binder was prepared by dispersing the powder in a part of the binder resin. This was accomplished by mixing the powder and the binder in a jar. The volume fraction of the powder in the slurry thus formed was 12.5%. The mixed slurry was then de-aired in a vacuum desiccator and a hardener was added to the mix. The slurry was then cast between two scintillator plates separated with a gap of about 0.08 mm. The cast plate assembly was then heat treated at 60° C. for 16 hours to ensure complete curing, i.e., polymerization of the slurry. The resulting high density reflector layer had a reflectance of 82% at 610 nm.

The preferred embodiments have been set forth herein for the purpose of illustration. However, this description should not be deemed to be a limitation on the scope of the invention. Accordingly, various modifications, adaptations, and alternatives may occur to one skilled in the art without departing from the spirit and scope of the claimed inventive concept.

All of the patents which are mentioned above are incorporated herein by reference.

What is claimed is:

1. A scintillator pack comprising:
   an array of scintillator pixels; and
   x-ray absorbing regions surrounding the scintillator pixels, the x-ray absorbing regions being filled with a high density x-ray absorbing material that consists of gadolinium sulfate.

2. The scintillator pack of claim 1, wherein the metal compound reflects scintillation radiation emitted by the scintillator pixels.

3. The scintillator pack of claim 1, further comprising:
   a scintillation radiation reflecting layer over the array of scintillator pixels.

4. An x-ray detection device comprising:
   a scintillator pack including an array of scintillator pixels, where a pixel of the array emits scintillation radiation upon an x-ray being absorbed by the pixel, and an x-ray absorbing layer comprising a high density x-ray absorbing material which is formed in inter-scintillator regions between the scintillator pixels; wherein the high density absorbing material is selected from the group consisting of gadolinium sulfate; and
   a scintillation radiation detector optically coupled to the scintillator pack for detecting the scintillation radiation.

5. The x-ray detection device of claim 4, wherein the scintillation radiation detector comprises an array of photodetector cells.

6. The x-ray detection device of claim 5, further comprising:
   a control system coupled to the array of photodetector cells for receiving signals output from the photodetector cells in response to scintillating radiation.

7. An x-ray device comprising:
   an x-ray source;
   a scintillator pack comprising an array of scintillator pixels, wherein a pixel of the array emits scintillation radiation upon an x-ray from the x-ray source being absorbed by the pixel, and x-ray absorbing regions surrounding the scintillator pixels, the x-ray absorbing regions being filled with a high density x-ray absorbing material that comprises a material selected from the group consisting of gadolinium sulfat; and
   a scintillation radiation detector optically coupled to the scintillator pack for detecting the scintillation radiation emitting therefrom.

8. The x-ray device of claim 7, wherein the x-ray device comprises a computed tomography system.

9. The x-ray device of claim 7, wherein the scintillation radiation detector comprises an array of photodetector cells.

10. The x-ray device of claim 7, wherein the scintillation radiation detector comprises at least one photodiode.

11. The x-ray device of claim 10, wherein the at least one photodiode is an array of photodiodes, wherein each photodiode of the array of photodiodes is optically coupled to a respective scintillator pixel.

* * * * *